United States Patent
Le Quere

(10) Patent No.: US 10,203,055 B2
(45) Date of Patent: Feb. 12, 2019

(54) CONNECTING DEVICE FOR TUBES AND GUIDE RING WITH FORCED CIRCULATION IN POTENTIAL RETENTION AREAS

(71) Applicant: PARKER HANNIFIN MANUFACTURING FRANCE SAS, Annemasse (FR)

(72) Inventor: Philippe Le Quere, Betton (FR)

(73) Assignee: PARKER HANNIFIN MANUFACTURING FRANCE SAS, Annemasse (FR)

( * ) Notice: Subject to any disclaimer, the term of this patent is extended or adjusted under 35 U.S.C. 154(b) by 427 days.

(21) Appl. No.: 14/774,781

(22) PCT Filed: Mar. 12, 2014

(86) PCT No.: PCT/EP2014/054899
§ 371 (c)(1),
(2) Date: Sep. 11, 2015

(87) PCT Pub. No.: WO2014/140141
PCT Pub. Date: Sep. 18, 2014

(65) Prior Publication Data
US 2016/0025250 A1    Jan. 28, 2016

(30) Foreign Application Priority Data
Mar. 12, 2013   (FR) ...................................... 13 52204

(51) Int. Cl.
*F16L 21/05*      (2006.01)
*F16L 55/027*     (2006.01)
(52) U.S. Cl.
CPC ............. *F16L 21/05* (2013.01); *F16L 55/027* (2013.01)

(58) Field of Classification Search
CPC ................................ F16L 21/05; F16L 55/027
(Continued)

(56) References Cited

U.S. PATENT DOCUMENTS 1,300,380 A * 4/1919 Griffin ...................... F15D 1/02
                                                         138/37
2,116,705 A   5/1938 Marx et al.
(Continued)

FOREIGN PATENT DOCUMENTS

| DE | 11 64 766 B | 3/1964 |
| FR | 2 920 887 A1 | 3/2009 |
| JP | S60 155002 A | 8/1985 |

OTHER PUBLICATIONS

International Search Report for corresponding patent application No. PCT/EP2014/054899 dated Apr. 11, 2014.

*Primary Examiner* — Aaron M Dunwoody
*Assistant Examiner* — Fannie C Kee
(74) *Attorney, Agent, or Firm* — Renner, Otto, Boisselle & Sklar, LLP

(57) ABSTRACT

A connection device comprising a body defining a channel having at least one tube end reception segment. Centering means for centering the tube end are arranged in a zone extending between the outer surface of the tube, a facing surface of the segment, and the sealing element. The centering means include positioning elements that are arranged to co-operate with a surface of the segment and with an outer surface of the tube and to define at least one sweeping duct for sweeping the zone, the duct having at least one inlet in the vicinity of which there extends at least one deflector arranged to insert, into the sweeping duct, fluid diverted from the flow traveling through the device, and at least one outlet for returning the fluid that has passed through the sweeping duct back to the flow.

12 Claims, 2 Drawing Sheets

(58) Field of Classification Search
USPC .............. 285/27, 125.1, 129.1, 131.1, 132.1, 285/133.11, 900
See application file for complete search history.

(56) References Cited

U.S. PATENT DOCUMENTS

| | | | | |
|---|---|---|---|---|
| 2012/0193906 A1* | 8/2012 | Alexander | ............ | E21B 17/085 285/27 |
| 2013/0087637 A1* | 4/2013 | Schnell | ................ | E03C 1/0409 239/428.5 |

* cited by examiner

CONNECTING DEVICE FOR TUBES AND GUIDE RING WITH FORCED CIRCULATION IN POTENTIAL RETENTION AREAS

FIELD OF INVENTION

The present invention relates to a connection device for connecting tubes in such a manner as to convey a flow of fluid and form a fluid transport circuit. The invention also provides a guide ring for a tube end in a connection.

BACKGROUND

The connection device for at least one tube end comprises a tubular body defining a channel having at least one tube end reception segment. An annular housing is defined in the reception segment and provided with an annular sealing element arranged to surround the tube end while leaving a portion of the tube end projecting from the sealing element towards an end of the segment. Beyond the sealing element, the wall of the housing serves to center the tube end portion projecting from the sealing gasket and the end of the segment is generally formed by a shoulder acting as an abutment preventing the tube end being pushed further into the reception segment. The connection device also has a retaining member for retaining the tube end in the reception segment. The retaining member is arranged upstream from the sealing gasket relative to the direction in which the tube end is inserted into the reception segment.

When liquid flows in the fluid transport circuit in which the connection device is included, the liquid tends to penetrate into and stagnate in the zone situated between the shoulder, the projecting tube end portion, and the sealing element. Since this zone can be accessed by cleaning liquid with difficulty if at all, liquid that has stagnated is not disposed of and runs the risk of degrading and polluting the fluid that is subsequently going to flow in the circuit.

In order to obviate that drawback, it is known to mount the sealing element between the shoulder and the terminal face of the tube end. However, that is found to be constraining from the point of view of designing the connection device.

SUMMARY OF INVENTION

An object of the invention is to improve accessibility to potential retention zones.

To this end, the invention provides a connection device for at least one tube end so as to convey a fluid flow, the device comprising a body defining a channel having at least one tube end reception segment, the reception segment being provided with an annular sealing element arranged to surround the tube end while leaving a portion of the tube end projecting from the sealing element towards an end of the segment, the device being characterized in that centering means for the projecting portion are arranged in a zone extending between the outer surface of the projecting portion, a facing surface of the segment, and the sealing element, and in that the centering means include positioning elements that are arranged to co-operate with a surface of the segment and an outer surface of the projecting portion and to define at least one sweeping duct for sweeping the zone, the duct having at least one inlet in the vicinity of which there extends at least one deflector arranged to insert, into the sweeping duct, fluid diverted from the flow traveling through the device, and at least one outlet for returning the fluid that has passed through the sweeping duct back to the flow.

By means of the deflector that extends into the flow of fluid traveling through the device, the ring serves to insert, into the sweeping duct, fluid that has been diverted from the fluid flow, and then serves to return, to the flow, the fluid that has passed along the sweeping duct. Thus, the ring enables flow of fluid to be forced through the zone surrounding the projecting tube end portion so as to ensure there is no stagnant fluid in this zone. When a cleaning liquid is flowing in the connection device, a portion of the cleaning liquid will also flow through said zone and clean it.

Preferably, the centering means of the device comprise a ring housed in the zone and, advantageously, the device wherein the ring comprises a band connecting together fins forming the positioning element, the fins projecting from the band firstly axially, and secondly radially both towards the inside and towards the outside.

The ring thus leaves open a maximum area in the zone, thereby improving potential for cleaning.

The invention also provides a centering ring for centering a tube end in a channel of a device of the above-specified type. The ring comprises positioning elements that are arranged to co-operate with a surface of the channel and an outer surface of the tube and to define at least one sweeping duct having at least one inlet in the vicinity of which there extends at least one deflector arranged to insert, into the sweeping duct, fluid diverted from the flow traveling in the device, and at least one outlet for returning the fluid that has passed through the sweeping duct back to the flow.

Other characteristics and advantages of the invention appear on reading the following description of particular, non-limiting embodiments of the invention.

BRIEF DESCRIPTION OF THE DRAWINGS

Reference is made to the accompanying drawing, in which.

DETAILED DESCRIPTION

Figure 1:
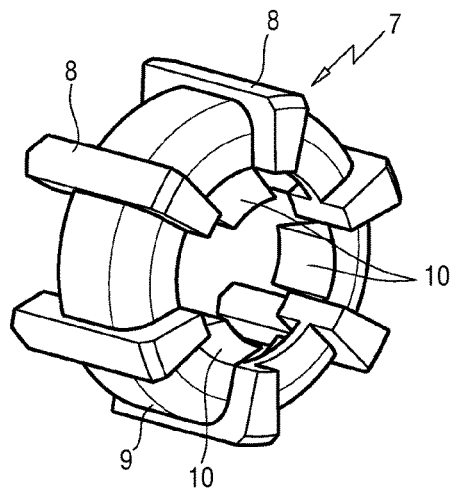
FIGS. 1 and 2 are perspective views seen from different angles, showing the centering ring of the invention.
Figure 2:
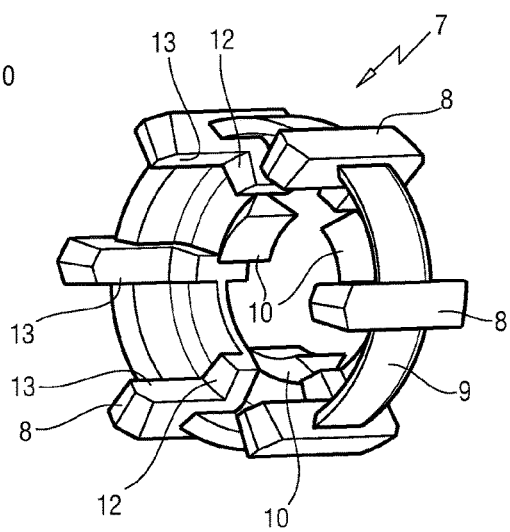
Figure 3:
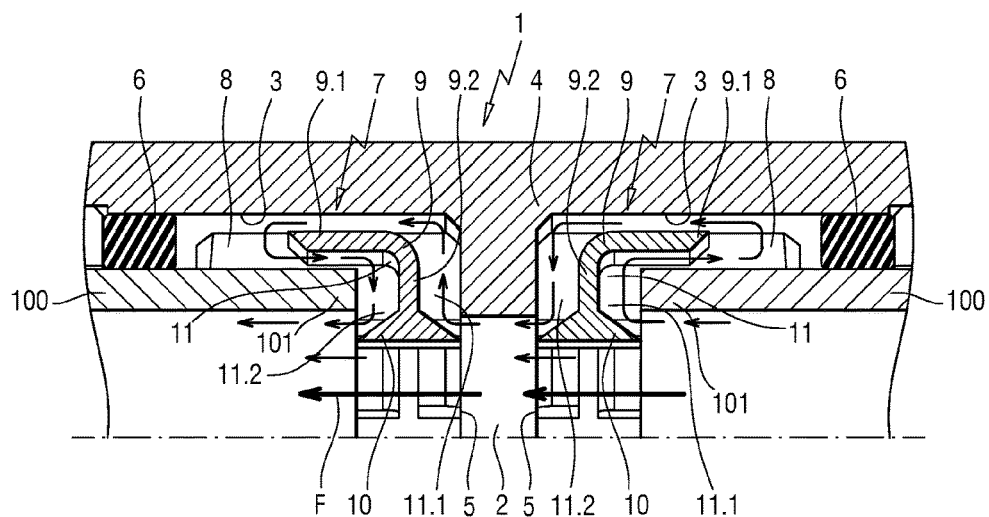
FIG. 3 is a fragmentary half-view in axial section of a connection device of the invention.

With reference to the figures, the connection device in accordance with the invention is described in an application connecting together two tube ends 100. The tube ends 100 and the connection device are for installing in a fluid transport circuit so as to convey a flow of fluid.

The connection device comprises a body 1 defining a channel 2 having two segments 3 for receiving respective tube ends 100. In this example, the reception segments 3 extend on either side of an annular ridge 4 having annular side faces constituting shoulders 5, each constituting an end of one of the reception segments 3.

Each reception segment 3 is provided with an annular sealing element 6 arranged to surround the tube end 100, while leaving a portion 101 of the tube end projecting from the sealing element 6 towards the shoulder 5. The reception segment 3 has a diameter greater than the tube end 100, and the sealing element 6 has an outside diameter slightly greater than the diameter of the reception segment 3 and an inside diameter slightly smaller than the outside diameter of the tube end 100 so as to be compressed between the surface of the reception segment 3 and the outside surface of the tube end 100. Each reception segment 3 is also provided with a retaining member of conventional type (and not shown herein) for retaining the tube end 100 in the reception segment 3. This retaining member may for example be a clamp, a toothed lock washer.

Each reception segment 3 houses a ring given overall reference 7 for centering the projecting portion 101, the ring being received in a zone extending between the outside surface of the projecting portion 101, the surface of the segment 3 facing said projecting portion 101, the shoulder 5, and the sealing element 6.

Each ring 7 has positioning elements that are arranged to co-operate with the surface of the reception segment 3 and the outside surface of the portion 101. These positioning walls are formed by radial fins 8 connected together by a band 9. The fins 8 project from the band 9 firstly axially, and secondly radially inwards and radially outwards.

The band 9 comprises a tubular portion 9.1 extending along the axis of the channel 2 and a radial annular portion 9.2 having an outer periphery secured to an end of the annular portion 9.1 opposite from the sealing element 6. The annular portion 9.2 projects from the tubular portion 9.1 towards the inside of the band 9.

The fins 8 are spaced apart from one another so as to co-operate with the outside surface of the tube end 100 and with the wall of the reception segment 3 to define sweeping ducts 11 for sweeping the zone extending between the outer surface of the projecting portion 101, the surface of the segment 3 facing said projecting portion 101, and the sealing element 6. Each sweeping duct 11 has an inlet 11.1 and an outlet 11.2 (which are inverted on the rings 7 given their opposite positioning relative to the flow directions). In the vicinity of the inlets 11.1 and outlets 11.2, there extend three deflectors 10 secured to an inner circumference of the annular portion 9.2 of the band 9. Each deflector 10 comprises a portion projecting towards the inside of the channel 2 relative to an inner surface of the tube end 100.

In this example, each deflector 10 is a double deflector. Facing the inlet 11.1, the deflector 10 has a curved portion extending into the flow and arranged to divert fluid from the flow and insert it into the sweeping duct 11. Facing the outlet 11.2, the deflector 10 has a curved portion extending into the flow to return the diverted fluid that has passed through the sweeping duct back to the flow.

As mentioned above, the bands 9 are arranged symmetrically, one upstream and the other downstream relative to the travel direction of the flow (referenced by arrow F), in such a manner that:
    the inlet and the associated deflector of the upstream band 9 face upstream in the travel direction F of the flow;
    the outlet and the associated deflector of the upstream band 9 face downstream in the travel direction F of the flow facing the inlet, while the associated deflector of the downstream band 9 faces upstream in the travel direction F of the flow; and
    the outlet and the associated deflector of the downstream band 9 face downstream in the travel direction F of the flow.

Thus, the deflector of the upstream band 9 deflects a portion of the flow towards the sweeping duct 11 of the upstream band 9, and then after the fluid has traveled along said sweeping duct 11, the deflector of the upstream band 9 directs said fluid downstream. The deflector of the downstream band 9 is arranged to direct the fluid coming from upstream towards the sweeping duct 11 of the downstream band 9, and then after the fluid has traveled along said sweeping duct 11, it reintroduces it into the flow traveling in the body 1.

It should be observed that at least some of the fins 8 do not come into contact with the sealing element 6, thereby enabling a portion of the fluid to pass from one sweeping duct to another via the passage thus left empty between the fins 8 and the sealing element 6.

The bands 9 have at least an outer surface made of a material having bactericidal properties, e.g. silver or copper, and/or a non-stick material, such as polytetrafluoroethylene.

It should be observed that discharge from the sweeping duct is facilitated by a Venturi effect at the outlets from the sweeping ducts 11. The deflectors 10 are arranged to encourage this Venturi effect.

It should be observed that the rings 9 press against the shoulders 5 and that the tube ends 100 press axially against shoulders 12 formed on an inner portion of each fin 8. The tube end 100 can thus be put firmly into abutment. The tube end 100 is positioned laterally by the inner surfaces 13 of the fins 8.

Naturally, the invention is not limited to the embodiments described, but covers any variant coming within the ambit of the invention as defined by the claims.

In particular, the body of the connection may have other shapes, for example it may be T-shaped or in the shape of a bend; it may be adapted to be connected to a single tube end, or to two or more tube ends.

It may have one deflector for the first end of the sweeping duct and another deflector for the second end of the sweeping duct.

The ring may be arranged to define a plurality of independent sweeping ducts, e.g. having two superposed axial portions that are connected together by a radial portion, or a plurality of sweeping ducts that are interconnected by a circumferential portion.

The ring may have a single annular deflector (which nevertheless runs the risk of disturbing the flow to a greater extent) or a plurality of separate deflectors that are in a circular arc. For each sweeping duct, it is possible to have a single bidirectional deflector or one or two unidirectional deflectors. Thus, a single unidirectional deflector may be arranged at the inlet of the sweeping duct, its outlet not having any deflector. Each deflector may be dedicated to one inlet and/or one outlet, or it may be common to two inlets and/or two outlets, for example.

The centering means may be made integrally with the body of the connection device.

Figure 4:
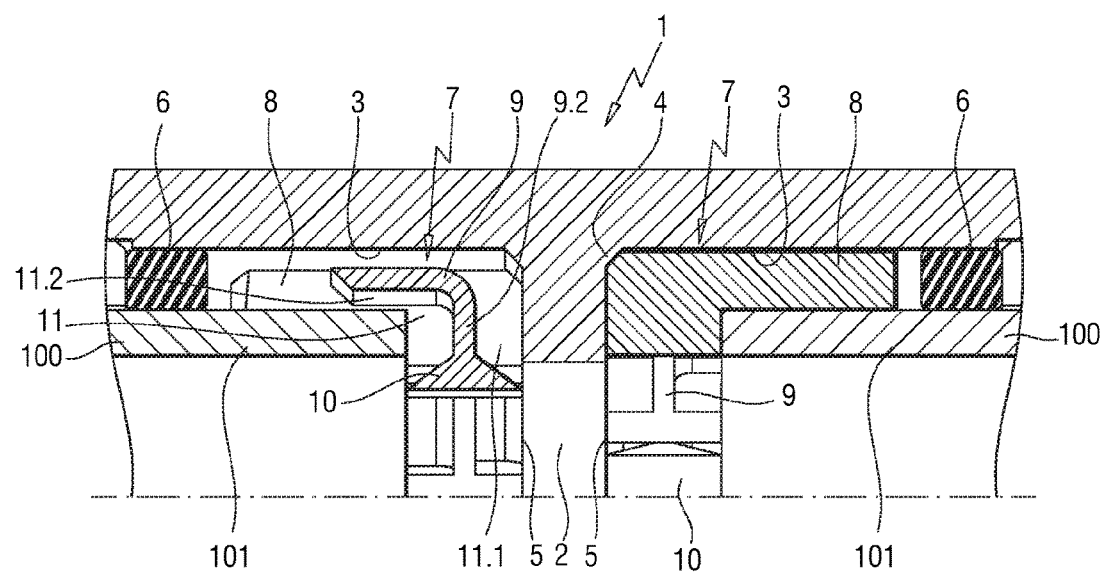
FIG. 4 is another fragmentary half-view in axial section of a connection device of the invention.

The rings may be arranged in such a manner that the deflectors of the rings are angularly offset relative to one another, as shown in FIG. 4.

In a variant, the body has at least one portion made of transparent material, situated facing said zone, making it possible to verify visually that the fluid or a cleaning liquid is indeed flowing in the zone.

The invention claimed is:
1. A connection device in combination with at least one tube end so as to convey a fluid flow, the device comprising:
    a body defining a channel having at least one tube end reception segment,
    the at least one reception segment being provided with an annular sealing element arranged to surround the at least one tube end while leaving a portion of the at least one tube end projecting from the sealing element towards an end of the at least one reception segment,
    wherein a centering ring for the projecting portion is arranged in a zone extending between an outer surface of the projecting portion, a facing surface of the at least one reception segment, and the sealing element, and wherein the centering ring includes positioning elements that are arranged to co-operate with the facing surface of the at least one reception segment and the outer surface of the projecting portion to define at least one sweeping duct for sweeping the zone, the at least one sweeping duct having at least one inlet in a vicinity of which there extends at least one deflector arranged to insert, into the at least one sweeping duct, fluid diverted from flow traveling through the device, and at least one outlet for returning the fluid that has passed through the at least one sweeping duct back to the flow.

2. A device according to claim 1, wherein the centering ring is housed in the zone and provided with the at least one deflector.

3. A device according to claim 2, wherein the centering ring comprises a band connecting together fins forming the positioning elements, the fins projecting from the band firstly axially, and secondly radially both towards the inside of the centering ring and towards the outside of the centering ring.

4. A device according to claim 3, wherein the band has a tubular portion extending along an axis of the channel and a radial annular portion having an outer periphery secured to one end of the annular portion opposite from the sealing element, the annular portion projecting from the tubular portion towards the inside of the band.

5. A device according to claim 4, wherein the at least one deflector is secured to an inner circumference of the annular portion.

6. A device according to claim 3, wherein at least some of the fins are not in contact with the sealing element.

7. A device according to claim 2, including two tube end reception portions so as to unite the at least one tube end with another tube end via the body of the device, each reception portion being provided with an annular sealing element and with one of the centering ring and another centering ring.

8. A device according to claim 7, wherein the another centering ring includes one or more deflectors, and the centering rings are arranged in such a manner that the deflectors of the centering rings are angularly offset relative to one another.

9. A device according to claim 2, wherein the centering ring has at least one outer surface made of a material having bactericidal properties.

10. A device according to claim 9, wherein the material having bactericidal properties is silver or copper.

11. A device according to claim 1, wherein the centering ring has at least an outside surface made of a non-stick material.

12. A device according to claim 11, wherein the non-stick material is polytetrafluoroethylene.

\* \* \* \* \*